(12) United States Patent
Patterson et al.

(10) Patent No.: US 9,063,641 B2
(45) Date of Patent: Jun. 23, 2015

(54) SYSTEMS AND METHODS FOR REMOTE COLLABORATIVE STUDYING USING ELECTRONIC BOOKS

(75) Inventors: James Patterson, San Francisco, CA (US); Nathan Moody, San Francisco, CA (US); Scott Dougall, Burbank, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/182,797

(22) Filed: Jul. 14, 2011

(65) Prior Publication Data

US 2012/0221937 A1    Aug. 30, 2012

Related U.S. Application Data

(62) Division of application No. 13/171,130, filed on Jun. 28, 2011.

(60) Provisional application No. 61/446,239, filed on Feb. 24, 2011.

(51) Int. Cl.
*G06F 17/20* (2006.01)
*G06F 3/0484* (2013.01)
*G06F 3/0482* (2013.01)
*G06F 3/0483* (2013.01)
*G06F 3/0488* (2013.01)
*G06F 17/24* (2006.01)
*G06F 17/22* (2006.01)

(52) U.S. Cl.
CPC .......... *G06F 3/04842* (2013.01); *G06F 3/0482* (2013.01); *G06F 3/0483* (2013.01); *G06F 3/04883* (2013.01); *G06F 17/241* (2013.01); *G06F 17/2235* (2013.01)

(58) Field of Classification Search
CPC ..................................... G06F 17/241
USPC ................................. 715/230, 232
See application file for complete search history.

(56) References Cited

U.S. PATENT DOCUMENTS 4,820,167 A    4/1989    Nobles et al.
4,985,697 A    1/1991    Boulton
(Continued)

FOREIGN PATENT DOCUMENTS

EP    1205898 A2    5/2002
JP    2005-189906 A    7/2005
(Continued)

OTHER PUBLICATIONS

Hinckley et al., "PapierCraft: A Gesture-Based Command System for Interactive Paper", ACM, 2008, pp. 18-18.27.*
(Continued)

*Primary Examiner* — James J Debrow
(74) *Attorney, Agent, or Firm* — Fenwick & West LLP

(57) ABSTRACT

An electronic book system provides interfaces particularly suited to students' use of textbooks. A finger press on a touch screen produces a contextual menu with user choices that relate to where the finger was pressed or what the user was recently doing with the book. A student provisionally navigates through a book by a specific gesture which, when it stops, returns the user to the previous position in the book. Annotations are displayed and hidden using specific gestures and through selective movement of the reader as sensed by its accelerometer.

10 Claims, 8 Drawing Sheets

(56) References Cited

U.S. PATENT DOCUMENTS

| | | | |
|---|---|---|---|
| 5,392,387 A * | 2/1995 | Fitzpatrick et al. | 715/776 |
| 5,463,725 A | 10/1995 | Henckel et al. | |
| 5,877,765 A | 3/1999 | Dickman et al. | |
| 5,893,132 A | 4/1999 | Huffman et al. | |
| 6,122,647 A | 9/2000 | Horowitz et al. | |
| 6,178,431 B1 | 1/2001 | Douglas | |
| 6,181,344 B1 | 1/2001 | Tarpenning et al. | |
| 6,340,967 B1 * | 1/2002 | Maxted | 345/179 |
| 6,438,564 B1 * | 8/2002 | Morton et al. | 715/206 |
| 6,590,568 B1 | 7/2003 | Astala et al. | |
| 6,704,733 B2 | 3/2004 | Clark et al. | |
| 6,957,233 B1 | 10/2005 | Beezer et al. | |
| 6,980,652 B1 | 12/2005 | Braitberg et al. | |
| 7,007,034 B1 | 2/2006 | Hartman et al. | |
| 7,058,902 B2 | 6/2006 | Iwema et al. | |
| 7,210,107 B2 | 4/2007 | Wecker et al. | |
| 7,270,546 B1 | 9/2007 | Adams, Jr. et al. | |
| 7,496,856 B2 | 2/2009 | Beezer et al. | |
| 7,546,524 B1 * | 6/2009 | Bryar et al. | 715/230 |
| 7,748,634 B1 | 7/2010 | Zehr et al. | |
| 7,779,347 B2 * | 8/2010 | Christiansen et al. | 715/230 |
| 7,793,233 B1 * | 9/2010 | Sellers et al. | 715/805 |
| 7,873,588 B2 | 1/2011 | Sareday et al. | |
| 8,131,647 B2 | 3/2012 | Siegel et al. | |
| 8,239,574 B2 | 8/2012 | Keum et al. | |
| 8,245,156 B2 | 8/2012 | Mouilleseaux et al. | |
| 8,433,431 B1 | 4/2013 | Master et al. | |
| 8,478,662 B1 | 7/2013 | Snodgrass et al. | |
| 8,504,369 B1 | 8/2013 | Chigier et al. | |
| 8,527,859 B2 | 9/2013 | Henshall et al. | |
| 2002/0037107 A1 | 3/2002 | Trachtman | |
| 2002/0054073 A1 | 5/2002 | Yuen | |
| 2002/0082939 A1 | 6/2002 | Clark et al. | |
| 2002/0087560 A1 | 7/2002 | Bardwell | |
| 2002/0091793 A1 | 7/2002 | Sagie | |
| 2002/0099552 A1 | 7/2002 | Rubin et al. | |
| 2002/0120635 A1 | 8/2002 | Joao | |
| 2002/0184189 A1 | 12/2002 | Hay et al. | |
| 2003/0013073 A1 | 1/2003 | Duncan et al. | |
| 2003/0206189 A1 | 11/2003 | Demello et al. | |
| 2003/0218070 A1 | 11/2003 | Tsikos et al. | |
| 2004/0109026 A1 | 6/2004 | Kessenich et al. | |
| 2004/0162846 A1 | 8/2004 | Nakahara et al. | |
| 2004/0175095 A1 | 9/2004 | Freeman | |
| 2004/0201633 A1 | 10/2004 | Barsness et al. | |
| 2004/0205568 A1 | 10/2004 | Breuel et al. | |
| 2004/0267527 A1 | 12/2004 | Creamer et al. | |
| 2005/0022113 A1 | 1/2005 | Hanlon | |
| 2005/0097007 A1 | 5/2005 | Alger et al. | |
| 2005/0132281 A1 | 6/2005 | Pan et al. | |
| 2005/0154760 A1 | 7/2005 | Bhakta et al. | |
| 2005/0193330 A1 | 9/2005 | Peters | |
| 2005/0210047 A1 | 9/2005 | Hayes et al. | |
| 2006/0053364 A1 * | 3/2006 | Hollander et al. | 715/512 |
| 2006/0085767 A1 | 4/2006 | Hinckley et al. | |
| 2006/0098899 A1 | 5/2006 | King et al. | |
| 2006/0114757 A1 | 6/2006 | Theimer et al. | |
| 2006/0182345 A1 | 8/2006 | Geidl et al. | |
| 2006/0194181 A1 | 8/2006 | Rosenberg | |
| 2007/0055926 A1 | 3/2007 | Christiansen | |
| 2007/0083906 A1 | 4/2007 | Welingkar | |
| 2007/0118794 A1 | 5/2007 | Hollander et al. | |
| 2007/0136657 A1 * | 6/2007 | Blumenthal et al. | 715/512 |
| 2007/0150801 A1 * | 6/2007 | Chidlovskii et al. | 715/512 |
| 2007/0180392 A1 | 8/2007 | Russo | |
| 2007/0300260 A1 | 12/2007 | Holm et al. | |
| 2008/0027726 A1 | 1/2008 | Hansen et al. | |
| 2008/0066185 A1 | 3/2008 | Lester et al. | |
| 2008/0141182 A1 | 6/2008 | Barsness et al. | |
| 2008/0168073 A1 * | 7/2008 | Siegel et al. | 707/100 |
| 2008/0222257 A1 * | 9/2008 | Mukherjee et al. | 709/206 |
| 2008/0222552 A1 | 9/2008 | Batarseh et al. | |
| 2008/0229182 A1 | 9/2008 | Hendricks et al. | |
| 2008/0229190 A1 | 9/2008 | Johnson | |
| 2008/0231610 A1 | 9/2008 | Hotelling et al. | |
| 2008/0233980 A1 | 9/2008 | Englund et al. | |
| 2008/0243991 A1 | 10/2008 | Ryan et al. | |
| 2008/0293450 A1 | 11/2008 | Ryan et al. | |
| 2008/0294674 A1 | 11/2008 | Reztlaff et al. | |
| 2008/0317346 A1 | 12/2008 | Taub | |
| 2008/0320579 A1 | 12/2008 | Rollins et al. | |
| 2009/0009532 A1 | 1/2009 | Hallberg | |
| 2009/0047647 A1 | 2/2009 | Welch | |
| 2009/0049077 A1 | 2/2009 | Lawlor | |
| 2009/0125413 A1 | 5/2009 | Le Chevalier et al. | |
| 2009/0187842 A1 | 7/2009 | Collins et al. | |
| 2009/0254802 A1 | 10/2009 | Campagna et al. | |
| 2009/0287604 A1 * | 11/2009 | Korgav et al. | 705/40 |
| 2009/0300539 A1 | 12/2009 | Hendricks | |
| 2010/0017701 A1 * | 1/2010 | Bargeron et al. | 715/230 |
| 2010/0050064 A1 | 2/2010 | Liu et al. | |
| 2010/0088746 A1 | 4/2010 | Kota et al. | |
| 2010/0161653 A1 | 6/2010 | Krasnow | |
| 2010/0185932 A1 * | 7/2010 | Coffman et al. | 715/230 |
| 2010/0214216 A1 | 8/2010 | Nasiri et al. | |
| 2010/0262659 A1 | 10/2010 | Christiansen et al. | |
| 2010/0274864 A1 | 10/2010 | Jalili | |
| 2010/0278453 A1 * | 11/2010 | King | 382/321 |
| 2010/0315359 A1 | 12/2010 | Seong et al. | |
| 2010/0324709 A1 | 12/2010 | Starmen | |
| 2010/0324895 A1 | 12/2010 | Kurzweil et al. | |
| 2011/0029435 A1 | 2/2011 | Ronen et al. | |
| 2011/0050591 A1 | 3/2011 | Kim et al. | |
| 2011/0050594 A1 | 3/2011 | Kim et al. | |
| 2011/0055760 A1 | 3/2011 | Drayton et al. | |
| 2011/0087955 A1 | 4/2011 | Ho et al. | |
| 2011/0106970 A1 | 5/2011 | Song et al. | |
| 2011/0153047 A1 | 6/2011 | Cameron et al. | |
| 2011/0153330 A1 | 6/2011 | Yazdani et al. | |
| 2011/0163944 A1 | 7/2011 | Bilbrey et al. | |
| 2011/0177481 A1 | 7/2011 | Haff et al. | |
| 2011/0184960 A1 | 7/2011 | Delpha et al. | |
| 2011/0195388 A1 | 8/2011 | Henshall et al. | |
| 2011/0202606 A1 * | 8/2011 | Agarwal et al. | 709/206 |
| 2011/0208614 A1 | 8/2011 | Tom | |
| 2011/0227949 A1 | 9/2011 | Kung et al. | |
| 2011/0231474 A1 | 9/2011 | Locker et al. | |
| 2011/0252415 A1 | 10/2011 | Ricci | |
| 2011/0261030 A1 | 10/2011 | Bullock | |
| 2011/0314427 A1 * | 12/2011 | Sundararajan | 715/863 |
| 2012/0001844 A1 | 1/2012 | Auguste et al. | |
| 2012/0019400 A1 | 1/2012 | Patel et al. | |
| 2012/0030022 A1 | 2/2012 | Ajima | |
| 2012/0046947 A1 | 2/2012 | Fleizach | |
| 2012/0066581 A1 | 3/2012 | Spalink | |
| 2012/0077175 A1 | 3/2012 | Levisay et al. | |
| 2012/0096094 A1 | 4/2012 | So et al. | |
| 2012/0102395 A1 | 4/2012 | Cho et al. | |
| 2012/0110429 A1 | 5/2012 | Tzonis et al. | |
| 2012/0113019 A1 | 5/2012 | Anderson | |
| 2012/0147055 A1 | 6/2012 | Pallakoff et al. | |
| 2012/0151397 A1 | 6/2012 | Oberstein et al. | |
| 2012/0204092 A1 | 8/2012 | Stoner et al. | |
| 2012/0210203 A1 | 8/2012 | Kandekar et al. | |
| 2012/0210269 A1 | 8/2012 | Yonemoto | |
| 2012/0221968 A1 | 8/2012 | Patterson et al. | |
| 2012/0231441 A1 | 9/2012 | Parthasarathy et al. | |
| 2012/0233539 A1 | 9/2012 | Reed | |
| 2012/0233552 A1 | 9/2012 | Chee et al. | |
| 2012/0235946 A1 * | 9/2012 | Zotov et al. | 345/173 |
| 2012/0236201 A1 | 9/2012 | Larsen et al. | |
| 2012/0240025 A1 | 9/2012 | Migos et al. | |
| 2012/0246343 A1 | 9/2012 | Story, Jr. et al. | |
| 2012/0284348 A1 | 11/2012 | Rothschild | |
| 2012/0310642 A1 | 12/2012 | Cao et al. | |
| 2012/0311438 A1 | 12/2012 | Cranfill et al. | |
| 2012/0311509 A1 | 12/2012 | Maggiotto et al. | |
| 2013/0041747 A1 | 2/2013 | Anderson et al. | |
| 2013/0080471 A1 | 3/2013 | Forte et al. | |
| 2013/0080968 A1 | 3/2013 | Hanson et al. | |
| 2013/0130216 A1 | 5/2013 | Morton et al. | |
| 2013/0174031 A1 * | 7/2013 | Constantinou | 715/256 |
| 2013/0191708 A1 | 7/2013 | Song | |
| 2014/0033030 A1 | 1/2014 | Pfister | |

(56) References Cited

U.S. PATENT DOCUMENTS

FOREIGN PATENT DOCUMENTS

| | | | |
|---|---|---|---|
| JP | 2008-033945 A | 2/2008 |
| KR | 10-2002-0002102 A | 1/2002 |
| KR | 10-2002-0006129 A | 1/2002 |
| KR | 10-2003-0000244 A | 1/2003 |
| KR | 10-2005-0108231 A | 11/2005 |
| KR | 10-06952090 B1 | 3/2007 |
| KR | 10-2008-0020122 A | 3/2008 |
| KR | 10-2010-0020246 A | 2/2010 |
| KR | 10-2011-0001105 A | 1/2011 |
| KR | 10-2011-0046822 A | 5/2011 |
| KR | 10-2011-0049981 A | 5/2011 |
| KR | 10-1051149 B1 | 7/2011 |
| KR | 10-2012-0087248 A | 8/2012 |
| WO | WO 2007-099529 A1 | 9/2007 |
| WO | WO 2012-115853 A2 | 8/2012 |

OTHER PUBLICATIONS

Kara et al., "Hierarchical Parsing and Recognition of Hand-Sketched Diagrams", 2004, ACM, pp. 13-22.*
ZiiLABS, "Creative Patents Found for "Drag and Drop" on Touchscreen Devices, Revealing Tabbed Web Browsing," Tech in Hiding, Aug. 7, 2009, 6 pages, [online] [retrieved on Jul. 18, 2011] Retrieved from the internet <URL:http://creative.techinhiding.com/2009/08/creative-patents-found-for-drag-and-drop-on-touchscreen-devices-suggesting-multi-tab-web-browsing/>.
Webpage for Whatever.com, 2011, 1 page, [online] [retrieved on Aug. 31, 2011] retrieved from the internet <URL:http://www.whatever.com/>.
"Babelshot Kitchen," Blog posts on posterous.com, 8 pages, [online] [Retrieved on Mar. 26, 2010] Retrieved from the Internet <URL:http://babelshot.posterous.com/>.
"iPhone's First Picture Translator," pictranslator.com, Fotozio, LLC, 2003, 2 pages, [online] [Retrieved on Mar. 26, 2010] Retrieved from the Internet <URL:http://www.pictranslator.com/index.html>.
Kavallieratou, E., et al., "Skew Angle Estimation in Document Processing Using Cohen's Class Distributions," Pattern Recognition Letters, Nov. 1999, pp. 1305-1311, vol. 20, Issues 11-23.
Mickey, K., et al., "E-Textbooks in Higher Education," Simba Information, 2010, 69 Pages.
PCT International Search Report and Written Opinion, PCT/US2010/051632, Nov. 29, 2010, 8 Pages.
PCT International Search Report and Written Opinion, PCT/US2010/051624, Nov. 30, 2010, 6 Pages.
"Product Overview for WorldCard Mobile iPhone" Penpower Technology Ltd., 3 pages, [online] [Retrieved on Mar. 26, 2010] Retrieved from the Internet <URL:http://worldcard.penpowerinc.com/worldcard-mobile-iPhone.html>.
"Product Overview for WorldCard Mobile Windows mobile" Penpower Technology Ltd., 1 pages, [online] [Retrieved on Mar. 26, 2010] Retrieved from the Internet.
Qiang, D., "Portable Translation of Words in Writing: new function to look up words using camera in Youdao dictionary (cell phone version), express delivery of new versions of the dictionary at the same time (referenced)," Blog post from www.163.com, Nov. 1, 2009, 5 pages, [online] [Retrieved on Mar. 26, 2010] Retrieved from the Internet <URL:http://dalong5401.blog.163.com/blog/static/102313220091011 0329225/>. With English Summary.
Amazon.Com, Inc., "Amazon Kindle User's Guide" 4th Edition, 2004-2011, pp. 1-120, can be retrieved at <URL:http://kindle.s3.amazonaws.com/Kindle_User's_Guide_4th_Edition.pdf>.
BBC, "Subtext," BBC—Learning Development, 1 page, [online] [retrieved on Apr. 23, 2012] Retrieved from the internet <URL:http://www.bbcattic.org/learningdevelopment/projects_subtext.shtml>.
BBC, "Bitesize Book Notes—Give You Brain a Boost," BBC—Book Notes, 2012, 1 page, [online] [retrieved on Apr. 23, 2012] Retrieved from the internet <URL:http://www.bbc.co.uk/schools/gcsebitesize/booknotes/>.

Damm, D., et al., "SyncTS: Automatic synchronization of speech and text documents," AES $42^{ND}$ International Conference, Ilmenau, Germany, Jul. 22-24, 2011, pp. 1-10.
Koolen, C., et al., "Electronic Environments for Reading: An Annotated Bibliography of Pertinent Hardware and Software (2011)," 95 Pages.
Landoni, M., "Evaluating E-books," BooksOnline'10, Oct. 26, 2010, pp. 43-46.
Landoni, M., "The Active Reading Task: E-books and their Readers," BooksOnline'08, Oct. 30, 2008, ACM, pp. 33-36.
Lei, D., "Define, translate and search for words in Google eBooks," Google Books Search, Google Inc., May 19, 2011, 3 pages, [online] [retrieved on Apr. 23, 2012] Retrieved from the internet <URL:http://booksearch.blogspot.com/2011/05/define-translate-and-search-for-words.html>.
Murray, A., "Discover more than 3 million Google eBooks from your choice of booksellers and devices," Google Books Search, Google Inc., Dec. 6, 2010, 2 pages, [online] [retrieved on Apr. 23, 2012] Retrieved from the internet <URL:http://booksearch.blogspot.com/2010/12/discover-more-than-3-million-google.html>.
Neary, L., "Children's Book Apps: A New World of Learning," NPR, Mar. 28, 2011, 3 pages, can be retrieved at <URL:http://www.npr.org/2011/03/28/134663712/childrens-book-apps-a-new-world-of-learning>.
Socialtext, Inc., "Socialtext 5.0 Features," 2012, 2 pages, [online] [retrieved on Apr. 23, 2012] Retrieved from the internet <URL:http://www.socialtext.com/features/>.
Subtext, "Subtext User Guide," 2011, 44 pages, can be retrieved at <URL:http://www.subtext.com/downloads/Subtext-User-Guide.pdf>.
Ribiére, M., et al., "The sBook: towards Social and Personalized Learning Experiences," BooksOnline'10, Oct. 26, 2010, ACM, 6 pages, can be retrieved at <URL:http://research.microsoft.com/en-us/events/booksonline10/ribiere-etal.pdf>.
Robinson, J., et al., "Using Linked Data to Reduce Learning Latency for e-Book Readers," ESWC 2011 Workshops, LNCS 7117, 2012, pp. 28-34.
Vignoli, F., et al., "A Text-Speech Synchronization Technique with Applications to Talking Heads," ISCA Archive, Auditory-Visual Speech Processing, Aug. 7-10, 1999, 5 Pages.
Wilson, R., et al., "The WEB Book experiments in electronic textbook design," Journal of Documentation, 2003, pp. 454-477, vol. 59, No. 4.
Office Action for U.S. Appl. No. 13/171,130, Jan. 5, 2012, 22 Pages.
PCT International Search Report and Written Opinion, PCT Application No. PCT/US2012/023628, Aug. 22, 2012, 9 pages.
PCT International Search Report and Written Opinion, PCT Application No. PCT/US2012/023584, Sep. 25, 2012, 9 pages.
PCT International Search Report and Written Opinion, PCT Application No. PCT/US2012/025438, Sep. 19, 2012, 12 pages.
PCT International Search Report and Written Opinion, PCT Application No. PCT/US2012/025443, Sep. 10, 2012, 11 pages.
PCT International Search Report and Written Opinion, PCT Application No. PCT/US2012/023599, Sep. 10, 2012, 9 pages.
United States Office Action, U.S. Appl. No. 13/182,809, Jun. 26, 2012, 12 pages.
United States Office Action, U.S. Appl. No. 13/171,130, Jun. 22, 2012, 20 pages.
United States Office Action, U.S. Appl. No. 13/103,813, Oct. 15, 2012, 20 pages.
PCT International Search Report and Written Opinion, PCT/US2012/025467, Jan. 2, 2013, 7 pages.
Office Action for U.S. Appl. No. 13/171,130, Nov. 23, 2012, 21 Pages.
Office Action for U.S. Appl. No. 13/182,733, Jan. 30, 2013, 13 Pages.
Office Action for U.S. Appl. No. 13/182,809, Jan. 25, 2013, 13 Pages.
Marshall, C., et al., "Turning the Page on Navigation," JDCL'05, Jun. 7-11, 2005, pp. 225-234.
Fenwick, J., et al., "Teaching Mobile Computing and Developing Software to Support computer Science Education," SIGCSE,'11, ACM Mar. 9-12, 2011, pp. 589-594.

(56) References Cited

OTHER PUBLICATIONS

Hamalainen, M., et al., "Electronic Markets for Learning: Education Brokerages on the Internet," Communications of the ACM, Jun. 1996, vol. 39, No. 6.
PCT International Search Report and Written Opinion, PCT/US2012/051643, Mar. 13, 2013, 9 Pages.
PCT International Search Report and Written Opinion, PCT/US2012/052622, Feb. 19, 2013, 9 Pages.
PCT International Search Report and Written Opinion, PCT/US2013/023683, May 13, 2013, 10 Pages.
U.S. Appl. No. 61/350,965, filed Jun. 3, 2010, 61 Pages.
Office Action for U.S. Appl. No. 13/182,787, Apr. 5, 2013, 16 Pages.
Office Action for U.S. Appl. No. 13/089,154, May 1, 2013, 18 Pages.
Office Action for U.S. Appl. No. 13/103,813, May 20, 2013, 19 Pages.
Office Action for U.S. Appl. No. 13/171,130, May 29, 2013, 19 Pages.
Parke, F., "Interactive Tools to Support Animation Tools," Computer Graphics Laboratory, New York Institute of Technology, ACM, 1986, pp. 89-91.
PCT International Search Report and Written Opinion for PCT/US2012/025339, Aug. 27, 2013, 12 Pages.
Office Action for U.S. Appl. No. 13/182,773, Aug. 20, 2013, 10 Pages.
United States Office Action for U.S. Appl. No. 13/171,130, Sep. 25, 2014, 25 pages.
United States Office Action for U.S. Appl. No. 13/171,130, Mar. 24, 2014, 28 pages.
United States Office Action for U.S. Appl. No. 13/171,130, Dec. 11, 2013, 27 pages.
United States Office Action for U.S. Appl. No. 13/103,813, Oct. 1, 2014, 17 pages.
United States Office Action for U.S. Appl. No. 13/103,813, Mar. 18, 2014, 13 pages.
United States Office Action for U.S. Appl. No. 13/089,154, Oct. 17, 2013, 14 pages.
United States Office Action for U.S. Appl. No. 13/280,197, May 2, 2014, 17 pages.
United States Office Action for U.S. Appl. No. 13/280,197, Oct. 25, 2013, 17 pages.
United States Office Action for U.S. Appl. No. 13/620,346, Dec. 6, 2013, 11 pages.
United States Office Action for U.S. Appl. No. 13/620,346, Oct. 17, 2014, 12 pages.
United States Office Action for U.S. Appl. No. 13/620,346, Mar. 24, 2014, 13 pages.
International Search Report and Written Opinion for International Application No. PCT/US2013/058782, Dec. 17, 2013, 9 pages.
International Search Report and Written Opinion for International Application No. PCT/US2013/056337, Nov. 26, 2013, 11 pages.
Gibron B., "The Simpsons—The Complete Fifth Season", DVD Talk, Dec. 21, 2004, pp. 1-7.
United States Office Action for U.S. Appl. No. 13/182,773, Dec. 23, 2014, 9 pages.

* cited by examiner

FIG. 4

SYSTEMS AND METHODS FOR REMOTE COLLABORATIVE STUDYING USING ELECTRONIC BOOKS

CROSS REFERENCE TO RELATED APPLICATION

This application is a divisional and claims the benefit of U.S. patent application Ser. No. 13/171,130 filed Jun. 28, 2011, entitled "Electronic Book Interface Systems and Methods" which claims the benefit of U.S. Patent Application Ser. No. 61/446,239, filed Feb. 24, 2011, entitled "Electronic Textbook Systems and Methods" both of these are incorporated by reference in their entirety as if fully set forth herein.

BACKGROUND

1. Technical Field

The invention generally relates to the field of electronic books and, more particularly, to systems and methods for accessing and otherwise working with book information via electronic devices.

2. Background Information

Even as widespread use of the Web reaches its twentieth anniversary, there has been little change in how people make use of textbooks. Students still fill their backpacks with as many of the five-pound books as will fit, and the impact of such paper-based learning is felt not only in students' backs, but in the carbon footprint of all of the infrastructure required to supply, use and dispose of such materials. A change of just a few pages in a textbook may make it obsolete and call for a new version to be printed; students carry not just this week's chapters with them everywhere, but last month's and next month's chapters as well.

Although some attempts have been made to transform study material from Gutenberg's era to the digital era, some of the advantages of using paper books for study purposes have not been replicated. Students from time immemorial have used their texts in different ways. Some highlight portions of particular interest; others place notes in the margins to keep track of clarifications of difficult concepts. Some used textbooks are more useful than new ones because they naturally fall open to the most important pages after repeated use, or because particularly important pages or sections are more dog-eared than others. Electronic reading devices have not to date provided interfaces to implement some of these subtle yet important features that help students learn from their texts most efficiently.

It would be advantageous to provide improved interface mechanisms for students to obtain, read, study from, and otherwise use textbook content with some of the tablet, laptop and other electronic devices that are now entering widespread use.

SUMMARY OF THE INVENTION

An electronic book reader including input recognition, annotation, and collaboration subsystems. Improved interaction methods provide more intuitive use of electronic books for studying. The provided annotation functionality allows a reader (e.g. a student) to make notes as is common with conventional paper books. The collaboration subsystem provides functionality to share these notes with others, enabling group learning on a variety of scales, from small study groups to collaborations with worldwide scope.

In one aspect, the electronic book reader is configured to provide tabs or other interface controls through which a user can access a syllabus for a particular course, corresponding textbooks, the student's own electronic notebook for the course, and lecture material (whether actual audio/video of the lecture, a slide deck used with the lecture, or related materials from the lecture).

In one aspect, the reader is configured to facilitate navigation through a textbook by providing various user options for provisionally or tentatively moving through the text, for instance to temporarily move to a glossary section before returning to the main text, or temporarily moving from a question page to a portion of the main text relating to the question. By using suitable gestures, the student navigates between these options in a provisional fashion that allows easy return to the main section of interest. In a related aspect, a bookmarking system facilitates easy access to portions the student identifies as important.

In a further aspect, the reader is configured to allow a student to attach annotations to an electronic textbook, in much the same way as a student might write notes in a conventional paper textbook. These notes can take on a wider range of forms than is possible conventionally. For example, a student can attach audio and video as well as more traditional textual annotations. In a related aspect, the reader is configured to provide tools for converting student annotations into computer searchable and manipulatable form.

In yet another aspect, the reader is configured to communicate with an accelerometer subsystem on the user's computer to allow the user to "pour" annotations off of, or onto, the user's view of the textbook to either remove clutter or provide annotations as the user may require at any particular time. The reader is configured to permit students to show all annotations, to show only certain annotations, to marginalize annotations, or to hide all annotations as preferred at any particular time.

In still another aspect, the reader is configured to allow students to use gestures to select portions of a textbook to copy over to the student's electronic notebook, for instance where such copying might provide a more efficient way of connecting concepts than merely annotating the textbook with notes. In a specific aspect, a user interface allows the student to include more or less information in such a guide, based on the student's needs and available study time.

The reader is further configured to facilitate collaboration not only with other students, but with a professor or other teacher, or a teacher's assistant assigned to help students with the class. In one aspect, the reader is configured to recognize the student's hand gesture in the form of a question mark on a textbook page to open a question to a moderator (e.g., teaching assistant). The student can then type in a question, and the moderator will know which portion of the textbook relates to the question based on the reader transmitting that information along with the question to the moderator. The reader provides a number of other predefined gestures and is further configured to allow users to define their own gestures (e.g., scribbling in the initials of a friend opens a chat with that friend, again keyed to the currently displayed portion of the textbook).

In another aspect, the reader is configured to assist a student in creating a personalized study guide. The presence of annotations made by the student and/or the prevalence of annotations made by other users informs which portions of an electronic book are included. The reader provides controls to allow the student to tailor the precise criteria used in generating the study guide to help meet their specific needs and requirements.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF THE DRAWINGS

FIG. 4 illustrates a user computer configured as an electronic book reader.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
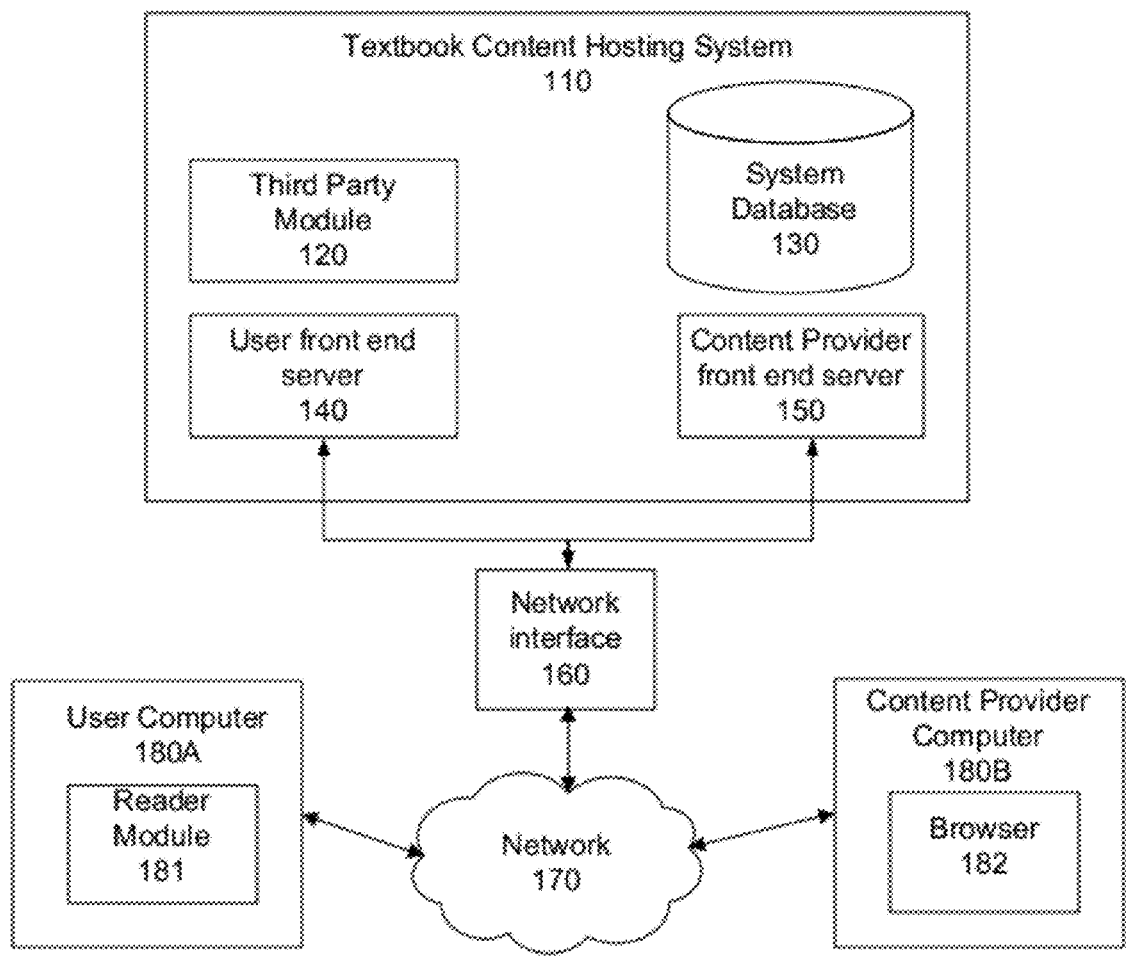
FIG. 1 is a high-level diagram illustrating a networked environment that includes an electronic book reader.

FIG. 1 is a high-level diagram illustrating a networked environment 100 that includes a book content hosting system 110. The embodiments discussed herein are particularly suited for textbooks, but one skilled in the art will recognize that many of the features discussed herein are applicable to various other types of books as well. The content hosting system 110 makes available for purchase, licensing, rental or subscription textbooks that can be viewed on user and content provider computers 180 (depicted in FIG. 1, for exemplary purposes only, as individual computers 180A and 180B) using a reader module 181 or browser 182. The content hosting system 110 and computers 180 are connected by a network 170 such as a local area network or the Internet.

The network 170 is typically the Internet, but can be any network, including but not limited to any combination of a LAN, a MAN, a WAN, a mobile, a wired or wireless network, a private network, or a virtual private network. The content hosting system 110 is connected to the network 170 through a network interface 160.

As discussed above, only a single user computer 180A is shown, but in practice there are many (e.g., millions of) user computers 180A that can communicate with and use the content hosting system 110. Similarly, only a single content provider computer 180B is shown, but in practice there are many (e.g., thousands or even millions of) content providers 180B that can provide textbooks and related materials for content hosting system 110. In some embodiments, reader module 181 and browser 182 include a content player (e.g., FLASH™ from Adobe Systems, Inc.), or any other player adapted for the content file formats used by the content hosting system 110.

User computer 180A with reader module 181 is used by users to purchase or otherwise obtain, and access, materials provided by the content hosting system 110. Content provider computer 180B is used by content providers to create and provide material for the content hosting system 110. A given computer can be both a client computer 180A and content provider computer 180B, depending on its usage. The hosting service 110 may differentiate between content providers and users in this instance based on which front end server is used to connect to the content hosting system 110, user logon information, or other factors.

The content hosting system 110 comprises a user front end server 140 and a content provider front end server 150 each of which can be implemented as one or more server class computers. The content provider front end server 150 is connected through the network 170 to content provider computer 180B. The content provider front end server 150 provides an interface for content providers to create and manage materials they would like to make available to users. The user front end server 140 is connected through the network 170 to client computer 180A. The user front end server 140 provides an interface for users to access material created by content providers.

The content hosting system 110 is implemented by a network of server class computers that can include one or more high-performance CPUs and 1G or more of main memory, as well as 500 GB to 2 Tb of storage. An operating system such as LINUX is typically used. The operations of the content hosting system 110, front end 140 and back end 150 servers as described herein can be controlled through either hardware (e.g., dedicated computing devices or daughter-boards in general purpose computers), or through computer programs installed in computer storage on the servers of the service 110 and executed by the processors of such servers to perform the functions described herein. One of skill in the art of system engineering and, for example, video content hosting will readily determine from the functional and algorithmic descriptions herein the construction and operation of such computer programs.

The content hosting system 110 further comprises a system database 130 that is communicatively coupled to the network 170. The system database 130 stores data related to the content hosting system 110 along with user and system usage information.

The system database 130 can be implemented as any device or combination of devices capable of persistently storing data in computer readable storage media, such as a hard disk drive, RAM, a writable compact disk (CD) or DVD, a solid-state memory device, or other optical/magnetic storage mediums. Other types of computer-readable storage mediums can be used, and it is expected that as new storage mediums are developed in the future, they can be configured in accordance with the descriptions set forth above.

The content hosting system 110 is further comprised of a third party module 120. The third party module 120 is implemented as part of the content hosting system 110 in conjunction with the components listed above. The third party module 120 provides a mechanism by which the system provides an open platform for additional uses relating to electronic textbooks, much as an application programming interface allows third parties access to certain features of a software program. In some embodiments, third party input may be limited to provision of content via content provide computers 180B and content provider third party server 150. Given the wide range of possible operation of system 100, however, in some embodiments it may be desirable to open additional capabilities for third parties who are not providing content to access the system. For example, aggregated data regarding what sections of a textbook are most often annotated may be helpful to the author of the textbook (or to other authors) to determine where additional explanation of difficult concepts might be warranted.

In this description, the term "module" refers to computational logic for providing the specified functionality. A module can be implemented in hardware, firmware, and/or software. Where the modules described herein are implemented as software, the module can be implemented as a standalone program, but can also be implemented through other means, for example as part of a larger program, as a plurality of separate programs, or as one or more statically or dynamically linked libraries. It will be understood that the named modules described herein represent one embodiment of the present invention, and other embodiments may include other modules. In addition, other embodiments may lack modules described herein and/or distribute the described functionality among the modules in a different manner. Additionally, the functionalities attributed to more than one module can be incorporated into a single module. In an embodiment where the modules as implemented by software, they are stored on a computer readable persistent storage device (e.g., hard disk), loaded into the memory, and executed by one or more processors included as part of the content hosting system 110. Alternatively, hardware or software modules may be stored elsewhere within the content hosting system 110. The content hosting system 110 includes hardware elements necessary for the operations described here, including one or more processors, high speed memory, hard disk storage and backup, network interfaces and protocols, input devices for data entry, and output devices for display, printing, or other presentations of data.

Numerous variations from the system architecture of the illustrated content hosting system 110 are possible. The components of the system 110 and their respective functionalities can be combined or redistributed. For example, the system database 130, third party module 120, user front end server 140, and content provider front end server 150 can be distributed among any number of storage devices. The following sections describe in greater detail the reader module 181, system database 130, and the other components illustrated in FIG. 1 in greater detail, and explain their operation in the context of the content hosting system 110.

Figure 2:
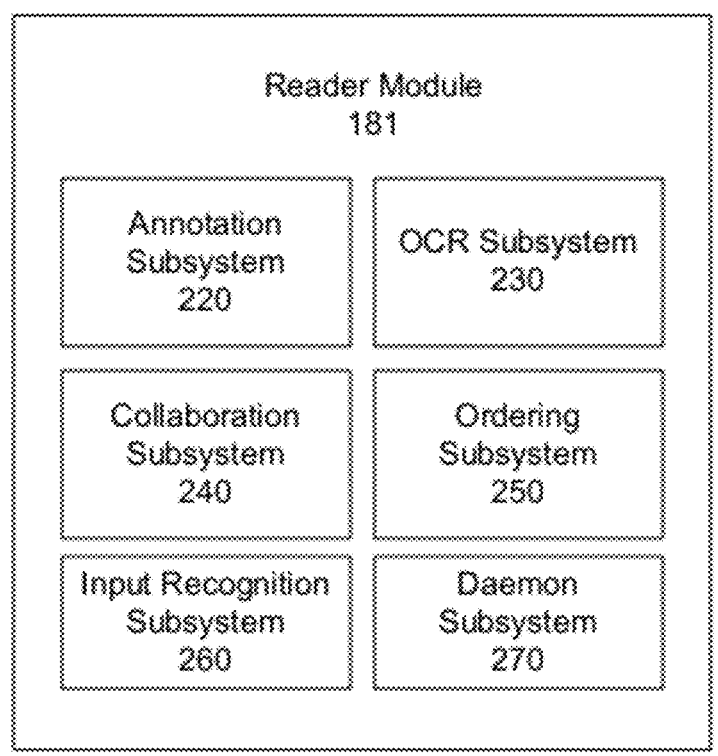
FIG. 2 illustrates a logical view of a reader module used as part of an electronic book reader.

FIG. 2 illustrates a functional view of a reader module 181 used as part of a electronic textbook system. In the embodiment described above in connection with FIG. 1, the reader module is implemented on user computer 180A, but it should be recognized that in other embodiments, portions discussed herein could also be implemented on other computers (e.g., those in content hosting system 110) that are in communication with reader module 181.

Reader module 181 is configured to address the fact that students use textbooks differently than other readers use typical books. Students typically study from, rather than merely read, textbooks. Studying is typically less linear than other reading, as texts are rarely read in "start-to-finish" manner. Studying is often much more interactive than typical reading, with annotations, cross-referencing between problem sets and main portions, reference to glossary or definitions sections, and the like. Studying is also inherently social and collaborative as well—far more so than most other types of reading. Learning in general, and studying in particular, typically combines attention to textbooks with creation and reference to notebooks, problem sets, lab experiment results, lecture materials, and other related sources.

Reader module 181 includes various subsystems to facilitate the specialized uses students make of textbooks. In the embodiment illustrated in FIG. 2, reader module 181 includes an annotation subsystem 220, an OCR subsystem 230, a collaboration subsystem 240, an ordering subsystem 250, an input recognition subsystem 260, and a daemon subsystem 270. Many of these subsystems interact with one another, as described below.

Annotation subsystem 220 provides various user tools and interfaces to allow students to mark up portions of an electronic textbook as they may find most helpful for learning and studying purposes. Annotation subsystem 220 includes conventional features such as highlighting and text entry tools, and also includes more advanced tools. For example, as described below annotation subsystem 220 keeps track of textbook portions for which a student has provided annotations, and collects those portions into a personalized study guide based on a user command.

OCR subsystem 230 is a recognition subsystem that takes information not originally in machine-readable form and converts it to machine readable form. For example, OCR subsystem 230 communicates with annotation subsystem 220 to convert handwritten student notes (entered graphically via finger or stylus gestures on a touch screen, for instance) into machine readable text. As used here, OCR subsystem 230 includes not only optical character recognition, but other types of recognition as well, for instance: voice-to-text recognition to allow a student to speak rather than write annotations; image to text recognition for photographs the student may take of a professor's notes on a blackboard during a lecture; and other types of recognition as well that may be provided within an electronic textbook or as a third party add-on.

Collaboration subsystem 240 provides various user functions that allow students to work together. As detailed below, for example, users can share their annotations and notes with their study group, their class section, their entire class, or other users worldwide of the electronic textbook. Further, collaboration subsystem 240 includes social network facilities to permit students to undertake study sessions with audio and visual chat, to ask and answer questions, and to submit questions to professors or teaching assistants.

Ordering subsystem 250 represents tools that allow students to obtain electronic textbooks and related materials. In one embodiment, ordering subsystem 250 is implemented as an electronic marketplace (e.g., the DROID™ marketplace implemented on the ANDROID™ operating system for smart phones and tablet computers). Third parties offer electronic textbooks and related materials such as study guides, problem sets, updates, workbooks, and the like. Some of these materials are available for purchase; others are free. In some embodiments, provision via other mechanisms (e.g., subscription, barter, "pay-per-view") is supported, as may be desired by any subset of a student community or content provider group.

Input recognition subsystem 260 provides user interface tools to facilitate use of electronic textbooks and related features. For instance, by sensing particular gestures on a touch screen of user computer 180A as discussed in detail below, the system temporarily shifts display of a textbook from a current page to a new section, while keeping track of the section of primary interest. Thus, a student working on a problem set section of the textbook can quickly look back at the text of the chapter, or a student reading a section for the first time can quickly jump to a glossary section of the textbook for a definition of an unfamiliar term or concept.

Reader module 181 is configured to permit user-selected applications to run to enhance a student's ability to work with an electronic textbook. For example, a student may purchase an application that provides study questions on a per-chapter basis for textbooks that do not include such questions. In addition, reader module 181 includes a daemon subsystem 270 to provide additional add-on features without the user launching a visible application for such features.

Further detail regarding reader module 181 and various subsystems thereof is provided below in connection with discussion of FIGS. 4-6.

Figure 3:
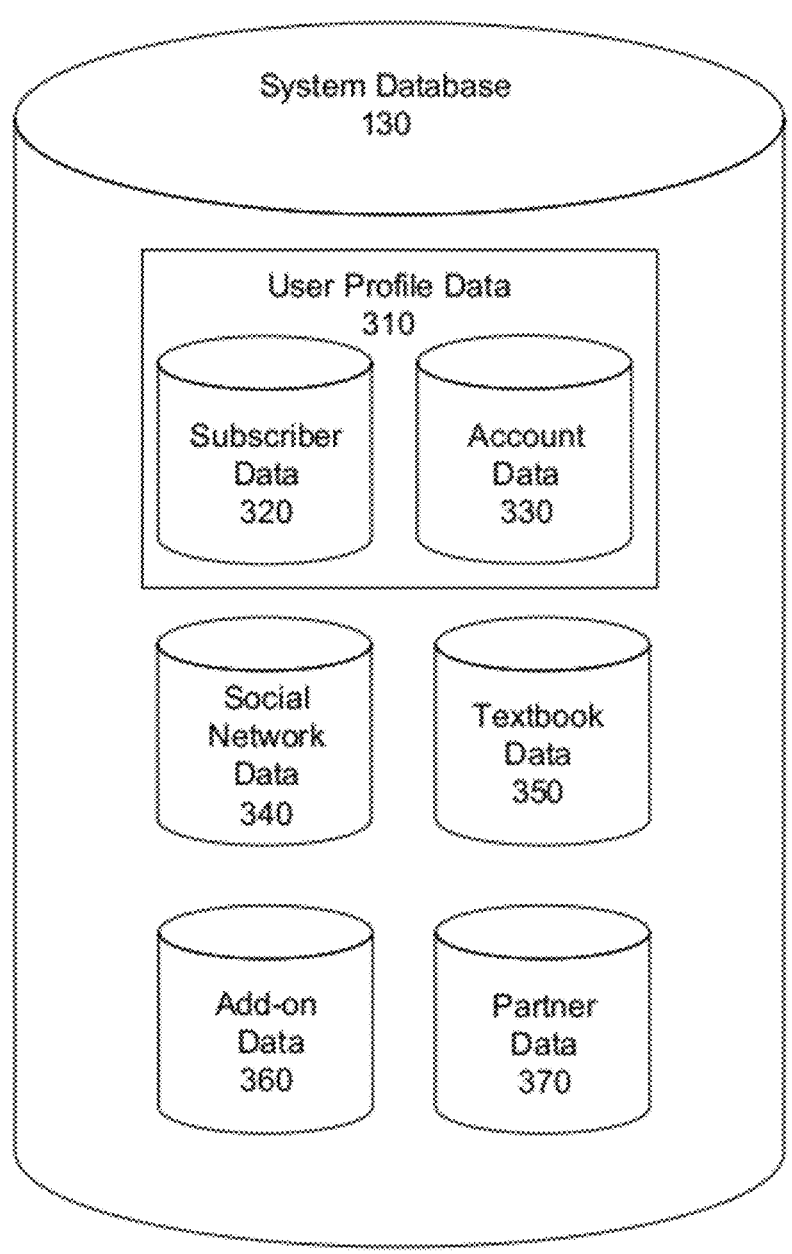
FIG. 3 illustrates a logical view of a system database that stores data related to the content hosting system.

FIG. 3 illustrates a functional view of the system database 130 that stores data related to the textbook content hosting system 110. The system database 130 may be divided based on the different types of data stored within. This data may reside in separate physical devices, or it may be collected within a single physical device.

With respect to content providers, partner data 370 comprises information regarding content providers or partners registered with the content hosting system 110 that have permission to create and deliver content. Partner data 370 includes provider contact information.

User profile data storage 310 includes information about an individual user (e.g., a student), to facilitate the payment and collaborative aspects of system 100. Subscriber data storage 320 includes identifying information about the student, such as the electronic textbooks the student has obtained and the social network groups the student has joined. In some embodiments, subscriber data storage 320 also maintains information regarding the location in each of the student's textbooks where the student is or was reading, to allow, for example, a student to read part of a textbook chapter on a smart phone while on a campus bus and continue reading from the same spot on the student's desktop computer in a dorm room.

Account data storage 330 keeps track of the user's payment mechanisms (e.g., Google Inc.'s CHECKOUT®) related to the user's ability to obtain content from system 100. Social network data storage 340 maintains the information needed to implement a social network engine to provide the collaborative features discussed herein, e.g., social graphs, social network preferences and rules. Textbook data 350 stores the actual content that is provided to users upon their request, such as electronic textbook files. Add-on data storage 360 maintains information for related features, such as non-static data relating to textbooks.

In one embodiment, conventional mechanisms are used to implement many of the aspects of system database 130. For example, the existing mechanisms from Google Inc.'s BOOKS™, GMAIL™, BUZZ™, CHAT™, TALK™, ORKUT™, CHECKOUT™, YOUTUBE™, SCHOLAR™, BLOGS™ and other products include aspects that can help to implement one or more of storage facilities 310-370 and modules 220-270. Google Inc. already provides eBook readers for ANDROID™ devices (phones, tablets, etc.), iOS devices (iPhones®, iPads® and other devices from Apple, Inc.) and various desktop Web browsers, and in one embodiment Google Inc.'s EDITIONS™ eBook reader application is modified to provide the functionality described herein.

Figure 4:
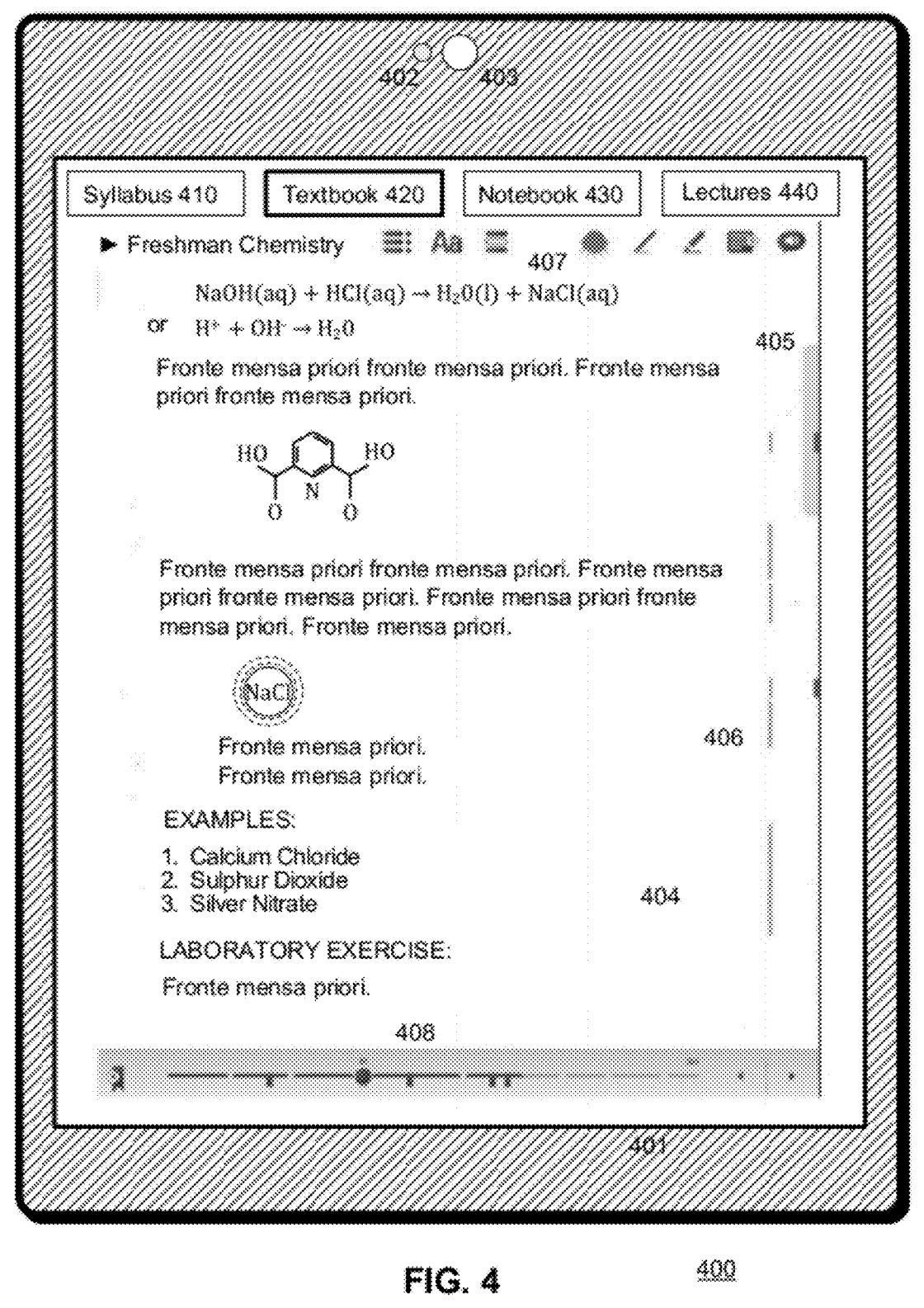

Referring now to FIG. 4, there is shown a portable computer 400 (e.g., a tablet computer running the ANDROID™ operating system) with a touch screen 401, a microphone 402, and a front-facing camera 403. As is known to those skilled in the art, such devices currently available typically also provide rear-facing cameras, accelerometers, GPS receivers, Wi-Fi and advanced cellular communications capabilities, and various other features. As shown, computer 400 is running reader module 181 and displaying a page 404 from an electronic textbook.

In one embodiment, reader module 181 provides four tabs above a main content area 404 allowing selection of four class modules via the following user interface icons: a Syllabus tab 410, a Textbook tab 420, a Notebook tab 430 and a Lectures tab 440. The Syllabus tab 410 provides course-specific information for the student, including a calendar of what portions of the text are going to be dealt with on what dates, when assignments are due, and when tests are scheduled. In one embodiment the student's performance during the class is also tracked here (e.g., grades on assignments and exams to date). The Textbook tab 420, shown in FIG. 4 as the currently selected tab, provides the actual textbook, as well as a number of navigational and other tools related to view of the textbook. The Notebook tab 430, when selected, causes the student's notebook for the course to be displayed (see discussion of FIG. 6, below). The Lectures tab 440, when selected, causes display of lecture-related materials, such as a professor may choose to provide to students. For example, a professor may provide slide decks used in a lecture, videos, or other materials that repeat or supplement what the professor presents in a lecture session.

More specifically, the display provided under the Textbook tab 420 includes a number of reading and annotation tools 407. First, the name of the currently selected textbook is displayed ("Freshman Chemistry") in a drop-down menu allowing selection of alternate texts for courses that use multiple textbooks. Not shown are controls, in one embodiment provided above tools 407, for selecting among various courses, for purchasing textbooks and related items, for opening a session or chat as described below, for launching a search engine, for changing system settings and for getting automated help.

To the right of the textbook title is an icon to display a table of contents, as well as an icon to change settings such as text size. To the right of that is an icon to toggle between regular view of the textbook and view of a user-generated study guide (discussed below). To the right of that is an eye-shaped icon, currently shown in the "eye shut" state, indicating whether to show user annotations (also detailed below). The last four icons are to add handwritten (pen) annotations (via a stylus or finger, as desired and as supported by computer 400), highlighting, sticky note annotations, and audio annotations to the textbook.

Below the primary content display area 404 are a set of page navigation tools 408. From left to right they include an icon to add a bookmark, an indicator of the current page (circle) in relation to various chapters (noted by breaks in the horizontal line) and previously set bookmarks, a number indicating the last page of the textbook, and arrows representing previous page and next page commands. The user touches on an appropriate portion of this display of tools 408 to accomplish a corresponding action.

Also shown on FIG. 4 is a large bar 405, which in one embodiment is colored yellow. Bar 405 indicates that the user has created a sticky note relating to this portion of the text. Smaller bars, in one embodiment displayed in gray, appear both within and below bar 405; in one embodiment these represent other types of annotations provided by the student, for example an audio annotation or a video annotation. Likewise, vertical lines 406 indicate still other student input, in one embodiment highlighting (straight lines) and handwritten annotations (squiggles). As noted above, the closed-eye icon in tools 407 indicates that all of this student-generated markup of the text is currently being hidden from view.

Figure 5:
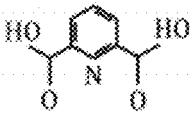
FIG. 5 illustrates a user computer configured as an electronic book reader, including user highlighting and annotations.

Referring now also to FIG. 5, the same tablet computer is shown, this time with the aforementioned eye icon in the open state (annotations displayed). The bar 405 now shows as a full sticky note, complete with a user control for settings (which in one embodiment include an OCR option to convert the handwritten text to clean machine-searchable text and an option to toggle between handwritten and machine text versions for display). In one embodiment, a small "resize handle" icon appears at the bottom of the note to allow the note to be made larger or smaller as the user may desire, and an "X" in the upper right hand corner of the note allows the user to delete the note if desired. The small gray bars referenced above are replaced with a "TV" icon indicating a video annotation as well as a small green circle with a number in it indicating how many comments have been entered concerning this annotation (e.g., by other students in a collaborative study session). A similar loudspeaker icon with a small green circle and corresponding number indicates an audio annotation and comments on that. Likewise, the highlighting and handwritten text previously indicated by vertical lines is now fully displayed. Also in this display, an indication of the current bookmarked status of the page is included in the upper left-hand corner, along with an "X" which, when touched by the user, removes the bookmark.

In some embodiments, reader module 181 uses accelerometer and other positioning input from computer 400 and interprets certain movements as commands. As one example, tilting computer 400 from portrait mode (as shown in FIGS. 4 and 5) to landscape mode triggers a change in the display from one page to two-page spread format. An abrupt partial tilt, on the other hand, when in the "show annotations" mode illustrated in FIG. 5, causes the annotations to be "poured" into the margin and the display switched to the "hide annotations" (corresponding to "closed eye" icon) mode illustrated in FIG. 4. A tilt in the other direction pours the annotations back into view.

Figure 6:
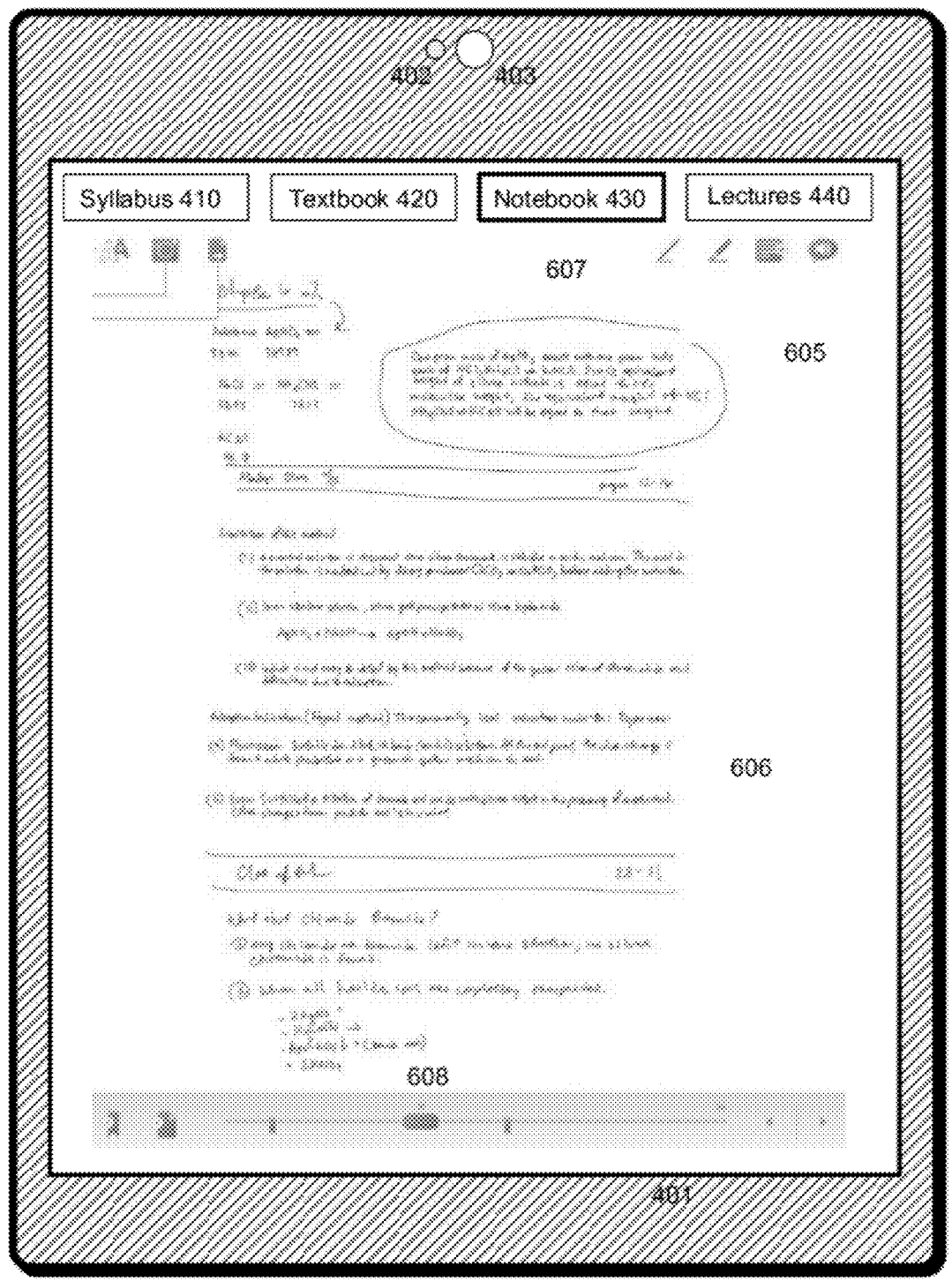
FIG. 6 illustrates a user computer configured as an electronic book reader, including a notebook interface.

Referring now to FIG. 6, the same user computer 400 is now shown after the user has selected the Notebook tab 430. In this mode of operation, in addition to the in-textbook annotations described above, a student can readily create and maintain a notebook keyed to specific portions of a textbook or lecture. A set of tools 607 provides icons that (from left to right) allow a student to change settings, such as displaying hand-entered text as shown here or a machine-recognized typed version of the same; to capture information from a whiteboard or chalkboard using camera 403 or (if equipped) a back-facing camera on computer 400; to share notes with others, to enter notes with a pen tool as described above, to highlight notes, to add a sticky note to the notebook, and to capture audio annotations corresponding to the notes from microphone 402. In one embodiment, the student can provide not only handwriting, but hand drawn shapes 605 as well in both the notebook and textbook annotation modes of operation. Likewise the student can provide notes in outline form 606. The page navigation tools 608 in the notebook mode of operations include icons (from left to right) to add a bookmark, add a new page to the notebook, and navigate among the pages of the notebook as previously explained in connection with textbook page navigation.

For annotations that are not already in machine-readable text form, the reader provides user tools for audio/visual/character recognition to convert such annotations into a form that can be machine searched and accessed. The reader includes a user interface tool to allow a user to toggle as desired between such original images and the corresponding machine readable text. In addition to recognizing text images, the reader also provides a user with an option to recognize lines and various geometric shapes from imaged or handwritten notes, such that cleaned-up versions of flow diagrams, molecular structures and the like can be easily made from sources having varied legibility.

Students' use of textbooks involves certain operations not typical of reading. For instance, most readers do not have questions that regularly arise in connection with their reading, but this is common for students who do not understand a concept very well from the textbook presentation. Accordingly, input recognition system 260 of reader module 181 provides a number of predetermined operations specifically oriented to textbook use, and also permits students to easily configure their own desired operations.

In one example, already mentioned, a student may find a portion of a text particularly "dense" in concepts, and may want to include more annotation for that section than could reasonably fit in the margins or elsewhere within the textbook display. In such instances, input recognition system 260 detects when a user has circled a portion of a textbook's content, either with a finger or a stylus. To indicate such detection, the selected area is displayed with a "glowing" appearance for a period of time. If, during that period of time, the user touches the glowing area and drags it to hover over the Notebook tab 430, input recognition system 260 detects this as a command to copy that portion of text into the student's notebook, where further room for annotation is available. In that event, the student's notebook becomes the active display, allowing the student to place the copied portion from the textbook anywhere in the notebook that may be desired, and to annotate on and around the added excerpt.

As a second example, specific annotations are immediately recognized as corresponding to commands rather than actual annotations. For example, in one embodiment a handwritten annotation in the form of a question mark with a circle around it is interpreted as a request to send a question regarding the nearby text to the appropriate teaching assistant for that course (or other predetermined moderator), and a dialog box immediately opens, preaddressed to the teaching assistant, allowing the student to ask the question. In one embodiment, the message to the teaching assistant is automatically tagged with the corresponding portion of the text so that the student does not need to include any context with the specific question, but can just include the question in a way that might be confusing without context. For example, if the text shows an illegal divide-by-zero operation, the student's question could simply be: "Why can't you do this?" without any further contextual information.

Likewise, other predefined gestures are provided in various embodiments. A "c" drawn with a circle around it, or a cartoon text balloon shape, is interpreted as a command to open a chat panel. A "k" with a circle around it or a pound sign (#) is interpreted as a command to open a keyboard panel. A squiggly line or repeated zig-zag is a command to delete a word or diagram. A handwritten name ("Jim") opens a chat panel with a familiar classmate. A specified word ("calc") invokes an installed add-on.

Users are also given the option of predefining their own gestures and self-recording arbitrary sequences of actions (similar to macros) that will be associated with those gestures. As one example, a user may define a letter "Q" with a circle around it to mean "Quit thoughtfully" and make that gesture correspond to saving all notebook edits, quitting the open textbook, and emailing notes to other study group members (e.g., Mike, Bob and Mary).

As noted above in connections with FIGS. 4 and 5, reader module 181 enables highlighting, sticky notes and annotations generally (e.g., 405, 406) to be selectively shown or marginalized. An advantage of marginalizing, rather than completely hiding, annotation is that marginal marks remind the student upon a second or third reading of a section that there are potentially helpful annotations available for that section. Furthermore, use of the accelerometer of computer 400 to either show or marginalize annotations upon a quick tilting of computer 400 provides a very quick and intuitive way for the student to switch between these two types of display. In some embodiments, user interface controls allow the specific gestures used to indicate show/marginalize annotations to be adjusted and otherwise changed, so that the sensitivity of these can be tuned to match a user's preference.

Reader module 181 also enables a student to mark certain annotations as private. In one embodiment, annotations are by default shared anonymously with the public (i.e., all others who have access to the electronic textbook), but in some environments, alternate embodiments may be more selective in sharing as may be more appropriate.

In one embodiment, reader 181 is configured to tag all portions of a textbook for which annotations have been provided such that a student can request a personalized study guide, comprised solely of the highlighted sections, to be generated. In one embodiment, each tagged section remains hyperlinked to the original full text to allow the student to quickly switch back to the full text for additional context regarding a particular section of interest. In one embodiment, this is accomplished by placing an underlined page number at the left margin of each section of the study guide; clicking on that number takes the user to the indicated page in the textbook.

In a related embodiment, collaboration subsystem 240 is configured to obtain information from other students as well regarding portions of the textbook that they have highlighted for generation of a user guide based on their annotated sections, in addition to the user's own annotated sections. In one embodiment, the student can select the student's own work group, other classmates, other students at the same school or at other select schools, or even all students worldwide for purposes of determining which annotations should be used to generate the study guide. To avoid a situation in which such "crowd-sourced" generation of annotated selections produces too large a study guide, in one embodiment a slider-style user interface (or other suitable user interface) allows a student to adjust selectivity for generation of the study guide. For instance, one setting includes all sections highlighted by any student, but another setting requires that at least five students provided annotations for a section to include it in the study guide (or for consideration of all students worldwide, 5% of the students providing annotations). Thus, a student may tailor a user guide for the amount of time the student may have available to use the guide. Undoubtedly, some students who have not read the entire text may also use this feature to determine which portions are considered most important for a first reading before an examination.

To provide a user experience showing that such additional annotated sections are being collected, an animated user interface that moves or "slurps" these additional annotated sections from outside the current field of view is shown when the user changes the slider to include more sections, and the additional sections are slurped out of the field of view as the user changes the slider to be more selective in which sections to have in the study guide.

In one embodiment, user interface tabs/buttons allow a user to select "My highlights," "Classmates' highlights," or "Everyone's highlights."

Many of the computers 400 on which reader module 181 will be implemented support multi-touch navigation by a user. However, not all of the multi-touch commands that may be most helpful for use of electronic textbooks are provided in a native manner on such devices. For instance, the standard "pinch-zoom" and swipe features available to change magnification and move through pages and chapters are certainly useful with textbooks, but more specific navigation choices are supported by reader module 181. For example, as noted above users of textbooks often need to make quick reference to another portion of the text and then return to where they were in the text. With a paper book, one often sticks a finger in the book at the current page and then moves to the page of temporary interest. Reader 181 permits a corresponding operation by placing a finger of one hand down on the screen 401 at a location showing the current page (e.g., near 404 on FIG. 4) and then using other existing page navigation techniques to move to another page (e.g., by swiping with two fingers of the other hand to move back a number of pages).

Additionally, the navigation footer 408 is persistent, and the user can quickly move around the book (either provisionally using the one-finger hold on the current page or normally) using this interface at any time.

When a user provisionally moves to a page, for instance to skim it, the user can either release using the left hand to return to the original page or release using the right hand to commit to the new page and abandon the original page.

In a related aspect to the collaboration among students discussed above, two or more students who are engaged in a chat regarding a textbook or who are in a study session using the textbook often need to help each other based on particular portions of a text. To facilitate this, collaboration subsystem 240 keeps track of where each student is in the textbook during collaboration and sends that information to the computers 400 of the other students in the collaboration, so that their current location is indicated for the others to see. Likewise, one student's annotations appear on the other students' computers 400 (with color coding for each student's annotations), as do gestures made by one student (e.g., pointing to a particular portion of text using either a mouse or a finger press on a touch screen device).

Figure 7:
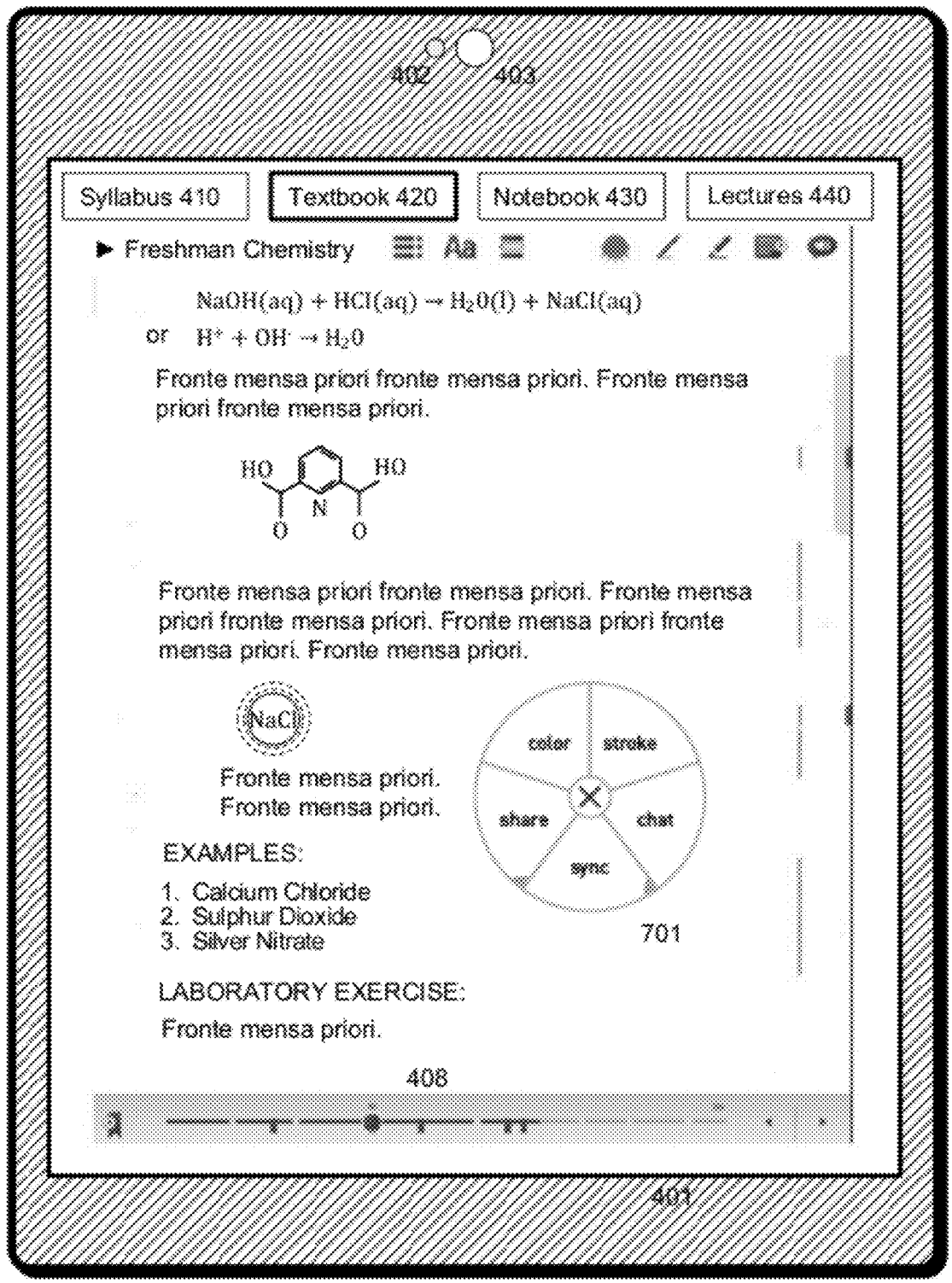
FIG. 7 illustrates a user computer configured as an electronic book reader, including a contextual menu.

Referring now to FIG. 7, the computer 400 implementing a reader 181, discussed above with respect to FIG. 4 is shown once again, this time with a display screen 401 including a contextual menu 701. In one embodiment, once a user presses and holds on a portion of the screen 401, a circle begins to appear, gradually drawn in a clockwise direction around the user's finger. The circle is complete after a finite period of short duration (say approximately 500 milliseconds) and then turns into the contextual menu 701. The purpose of such animation is to alert the user that by holding a finger on the screen, the user is requesting such a menu (release of the finger before the menu is complete makes the incomplete circle disappear and the menu is not formed). In addition, the animation assists users pressing near the edge of a screen to see that menu 701 is being created, even if a portion of the developing circle is obscured by the edge of the screen. Contextual menu 701 provides, in this embodiment, six areas for further user selection: a central area with an "X" in it to close the menu (tapping outside the menu will also close it), and five choices for further user selection. Menu 701 is a contextual menu because the user choices are not always the same, but instead are based on what is displayed on screen 401 as well as where on the screen the user has asked the menu to appear. For instance, if the user presses a finger over a chart or diagram, a different set of choices may appear than if the user presses a finger over body text, or over white space as shown in FIG. 7.

Figure 8:
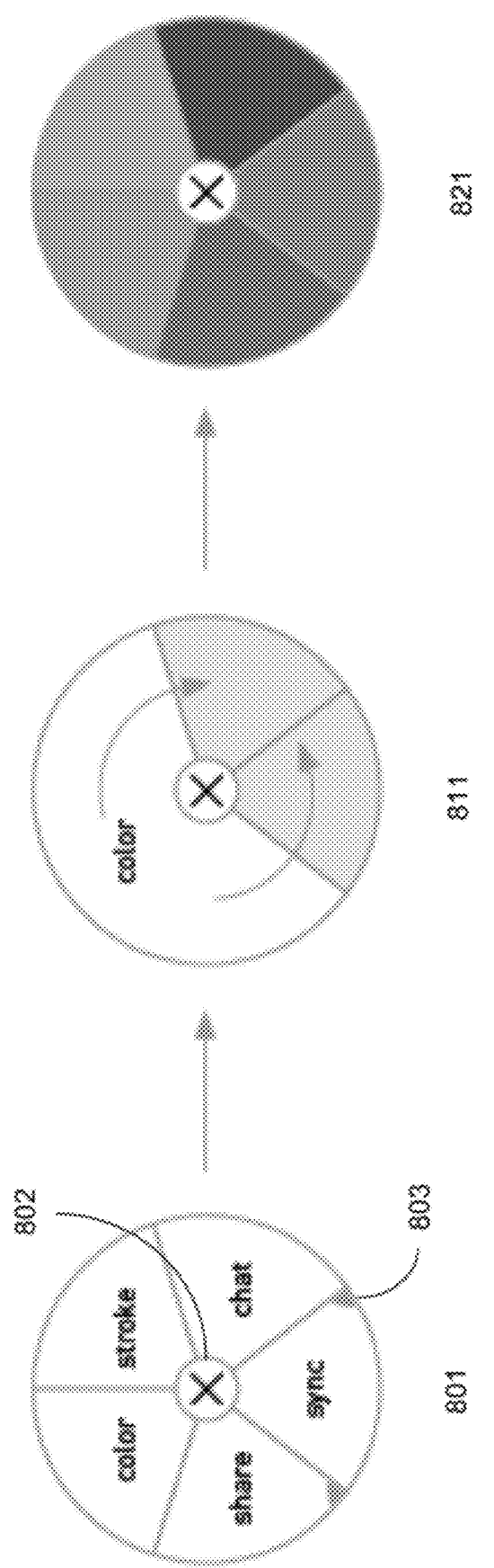
FIG. 8 illustrates operation of the contextual menu of FIG. 7.

Referring now to FIG. 8, there is shown a progression of contextual menus in one example, from a menu of action choices 801 to a display showing a selected choice 811, and then to a menu 821 of a series of additional user choices that result. Specifically, menu 801 includes five user choices related to annotations, in this case color, stroke, chat, sync and share, that the user can select. In this instance, color denotes a choice of a color for annotations, stroke denotes gesture recognition activation (and in alternate embodiments, various gesture-related configuration and operation choices), chat denotes activation of a chat window, sync denotes synchronizing the user's display with that of other connected students (e.g., to share annotations), and share denotes sharing of annotations with other students. The latter two choices also have small triangular blocks in the lower right of their respective menu portions in menu 801; in this embodiment these blocks indicate that the choices will spawn additional user choices (i.e., not result in any action being taken immediately without the opportunity for further user selection, for example by presentation of a further menu of user choices). A central circle 802 with an "X" in it provides a mechanism to close the circular menu, and is primarily used for newer users who may not understand that menu 801 can also be closed by simply tapping outside of menu 801. In a related embodiment, small graphics rather than words are used to denote the user's options: An artist's palette for "color", a swoosh symbol for "gesture", a word bubble for "chat", a circle with rotating arrows for "sync", and a document with an arrow for "share".

Assuming for present purposes that the user selects "color" from menu 801, that portion of the menu gradually expands as shown in circle 811, providing the user recognition that the input has been received. Again, this takes approximately 500 milliseconds, after which the next set of user choices is displayed via menu 821. In this instance, the user choices are not textual at all, but include different colors that the user may select by tapping on the appropriately colored portion. Once the user does that, a similar indication of recognition is provided by having that color similarly grow into a circle that is entirely made up of the selected color (not shown). For choices that do not result in further menus or other selection choices, indication of finality is provided by having the choice blink in confirmation and then fade from view. In this instance, the selected color, after growing to encompass the entire circle (other than the small circle 802) blinks and then fades from view.

In some embodiments, a different number of user selections than five is provided in menus 801 and 821, as may be appropriate for a given context in which the menu is enabled. Other contexts will also call for a different set of user choices within menu 801. For example, referring again to FIG. 4, if the user presses and holds on a portion of an annotation area, e.g., 405, an annotation menu appears differing from menu 801 in that "delete" appears rather than "color", "append" appears rather than "stroke", and "question" appears rather than "chat" (with the remaining items, "sync" and "share" still appearing as in menu 801). In this instance, delete is used to remove an annotation, append is used to send the annotation from the textbook display to the user's notebook (shown on FIG. 6), and question is used to embed the annotation in a question to be addressed to a fellow student, teaching assistant or professor. Wherever possible, menu items that are common across contexts are placed in consistent areas on menu 801 to facilitate ease of use.

Contextual menus, e.g., 801 are brought up in different forms based not only on location of the user's finger press (e.g., over body text of the book as opposed to over a user's own annotation), but also based on when the press is made (e.g., immediately after highlighting a section of text) and based on other triggering events (e.g., recently receiving a question or annotation from another student) that might warrant actions that would not be needed otherwise. By providing menus with context-driven choices, the need for interface "real estate" on the screen is reduced, since inapplicable choices simply do not appear rather than appearing in grayed-out text as is done with many conventional menu systems.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs executed by a processor, equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for providing interfaces for electronic books through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. An electronic book reader, comprising:
   a display for displaying an electronic book;
   an annotation subsystem configured to provide a user interface on the display, the user interface configured to enable a user to author annotation content and associate the annotation content with a corresponding portion of the electronic book;

an input recognition subsystem, operably connected to the annotation subsystem, configured to recognize a specific portion of the annotation content as a command to create a message, the message being automatically addressed to a predetermined moderator assigned to the electronic book and including an automatically generated indication to the moderator of which portion of the electronic book was being viewed by the user when the message was created; and a collaboration subsystem, operably connected to the input recognition subsystem, configured to provide user controls to enable the user to create a body for the message and send the message to the predetermined moderator.

2. The electronic book reader of claim 1, wherein the specific portion is a predetermined symbol.

3. The electronic book reader of claim 2, wherein the specific portion corresponds to a drawn gesture.

4. A computer implemented method for using an electronic book, comprising:
providing a user interface configured to enable a user to author annotation content and associate the annotation content with a corresponding portion of the electronic book;
recognizing a specific portion of the annotation content as a command to create a message;
creating a message automatically addressed to a predetermined moderator assigned to the electronic book in response to the recognizing, the message including an automatically generated indication to the moderator of which portion of the electronic book was being viewed by the user when the message was created;
providing user controls to enable the user to create a body for the message; and
sending the message to the predetermined moderator.

5. The method of claim 4, wherein the specific portion is a predetermined symbol.

6. The method of claim 5, wherein the specific portion corresponds to a drawn gesture.

7. A non-transitory computer readable storage medium containing computer executable instructions for using an electronic book, the instructions comprising:
instructions to provide a user interface configured to enable a user to author annotation content and associate the annotation content with a corresponding portion of the electronic book;
instructions to recognize a specific portion of the annotation content as a command to create a message;
instructions to create a message automatically addressed to a predetermined moderator assigned to the electronic book in response to the recognizing and including an automatically generated indication to the moderator of which portion of the electronic book was being viewed by the user when the message was created;
instructions to provide user controls to enable the user to create a body for the message; and
instructions to send the message to the predetermined moderator.

8. The non-transitory computer readable storage medium of claim 7, wherein the specific portion is a predetermined symbol.

9. The non-transitory computer readable storage medium of claim 8, wherein the specific portion corresponds to a drawn gesture.

10. An electronic book reader, comprising:
means for displaying an electronic book;
means for a user to author annotation content and associate the annotation content with a corresponding portion of the electronic book;
means for recognizing a specific portion of the annotation content as a command to create a message, the message being automatically addressed to a predetermined moderator assigned to the electronic book recognizing and including an automatically generated indication to the moderator of which portion of the electronic book was being viewed by the user when the message was created; and
means for the user to create a body for the message and send the message to the predetermined moderator.

* * * * *